(12) United States Patent
Vukovic et al.

(10) Patent No.: US 6,973,061 B2
(45) Date of Patent: Dec. 6, 2005

(54) METHOD AND APPARATUS FOR SORTING PACKETS IN A COMMUNICATION SYSTEM

(75) Inventors: Ivan N. Vukovic, Arlington Heights, IL (US); Rajest Pazhyannur, Palatine, IL (US); Irfan Ali, Northbrook, IL (US); Philip J. Fleming, Glen Ellyn, IL (US)

(73) Assignee: Motorola, Inc, Schaumburg, IL (US)

( * ) Notice: Subject to any disclaimer, the term of this patent is extended or adjusted under 35 U.S.C. 154(b) by 833 days.

(21) Appl. No.: 09/810,766

(22) Filed: Mar. 16, 2001

(65) Prior Publication Data
US 2002/0131434 A1     Sep. 19, 2002

(51) Int. Cl.[7] ............................................. H04Q 7/00
(52) U.S. Cl. ..................................... 370/331; 370/394
(58) Field of Search ............................... 370/328, 329, 370/330, 331, 335, 342, 345, 349, 394, 474, 370/473, 475, 395.1

(56) References Cited

U.S. PATENT DOCUMENTS

| | | | | |
|---|---|---|---|---|
| 5,293,484 A | * | 3/1994 | Dabbs et al. ................... | 705/1 |
| 5,606,552 A | * | 2/1997 | Baldwin et al. ............. | 370/474 |
| 6,157,621 A | * | 12/2000 | Brown et al. ................ | 370/310 |
| 6,331,987 B1 | * | 12/2001 | Beser .......................... | 370/486 |
| 6,459,687 B1 | * | 10/2002 | Bourlas et al. ............. | 370/328 |
| 6,738,379 B1 | * | 5/2004 | Balazinski et al. ......... | 370/394 |
| 2001/0033341 A1 | * | 10/2001 | Limberg ..................... | 348/614 |

OTHER PUBLICATIONS

Zhu Han; "Study of DS-CDMA, RAKE Receiver and Proposal for a Multicarrier DS-CDMA System over Multipath Fading Channel"; Sponsored by NASA; Institute for Systems Research and Department of Electrical and Computer Engineering, University of Maryland, Jul. 1999; pp. 1-22.

* cited by examiner

*Primary Examiner*—Kwang Bin Yao
(74) *Attorney, Agent, or Firm*—Steven A. May

(57) ABSTRACT

A communication system sorts packets or messages at a base station such that differential delays and absolute delays are reduced, further resulting in less needed memory at the packet selector and reduced jitter. The sorting is based on a packet identifier that is associated with each packet or message, which packet identifier includes data specific to the packet.

7 Claims, 5 Drawing Sheets

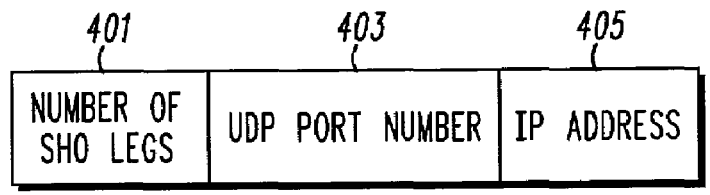
*400*  FIG. 4
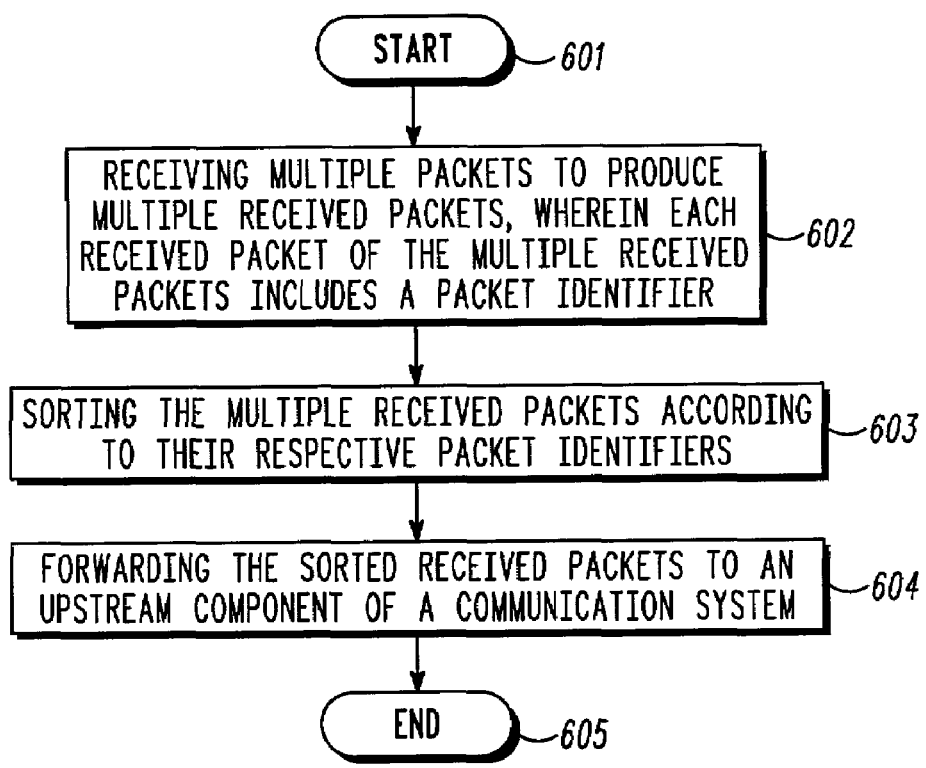
*600*  FIG. 6

US 6,973,061 B2

METHOD AND APPARATUS FOR SORTING PACKETS IN A COMMUNICATION SYSTEM

FIELD OF THE INVENTION

This invention relates to communication systems, including but not limited to message routing in communication systems.

BACKGROUND OF THE INVENTION

Communication systems are known to comprise an infrastructure, typically including a plurality of base stations, a controller, a home location register (HLR), and a mobile switching center (MSC), that provides communication services to communication units located in corresponding service coverage areas of the base stations. One example of such a communication system is a cellular communication system, which may also comprise one or more routers, one or more transcoders, and one or more selector distributor units (SDUs). In a cellular system, a remote unit, also known as a communication unit, (e.g., a mobile or portable radiotelephone) that desires to communicate, sends a channel request message to a base station serving the coverage area in which the remote unit is located. Upon receiving the channel request message, the infrastructure of the cellular system allocates a communication channel for the communication, and the remote unit begins communicating with a telephone network subscriber or another remote unit via the serving base station. Typically, multiple access wireless communication between the base station and the remote stations occurs via radio frequency (RF) channels or communication resources that provide paths over which communication signals such as voice, data, and video are transmitted.

One type of cellular communication system, Code Division Multiple Access (CDMA), utilizes spread spectrum digital technology in order to obtain higher bandwidth efficiency for a given wireless spectrum allocation. CDMA relies on processing power to extract a coded signal embedded across a broad frequency spectrum. In order to extract the desired signal from among many other overlaid unwanted signals, one utilizes the code correlated to the desired signal. The use of coding allows more channels to be derived by the overlaying of carriers one over another and greatly enhances performance in terms of derived channels per Hertz of bandwidth.

In a CDMA system, packets of information are sent from remote units to base stations, which forward the packets via an access node or router to one or more SDUs. Because a transmission from a remote unit may be received and forwarded by one or more base stations, the SDU selects the best version of the message and forwards that version to a transcoder for further processing. As a result, two types of message delay occur between the base stations and the transcoder: absolute delay and differential delay. Absolute delay relates to a time expiring between a receiving a first version of a message at any base station and the SDU sending a best version to the transcoder. Differential delay relates to a time expiring between receiving a first version of a message and a last version of the same message at the SDU. Differential delay is one of the components of the absolute delay and is one of the main sources of delay variation or jitter. Different versions of messages are also known as soft handoff legs (SHO legs). Differential delay is defined only in the case of a call with multiple SHO legs.

Messages are sent from remote units or mobiles at fixed intervals, arriving at base stations in batches and forcing the base stations to queue them. A result of the queuing of messages in various base stations is a variation in a delay introduced by each base station, even in the case of a call with a single SHO leg, since messages from different remote units get queued a in different order in each base station. The quality of a service of a connection is dependent on both the absolute delay and the differential delay. Delay variation, caused mostly by batch message arrivals and multiple SHO legs, can, if excessive, cause the transcoder to slip and also cause the SDU to require extra memory to store all messages it receives before the SDI selects a best version that is sent to the transcoder.

Therefore, there is a need for a method of routing a call such that differential delays and absolute delays are reduced.

BRIEF DESCRIPTION OF THE DRAWINGS

FIG. 4 is a block diagram of a packet identifier suitable for sorting packets in accordance with an embodiment of the present invention.

FIG. 6 is a logic flow diagram of steps executed by a communication system in sorting packets in accordance with an embodiment of the present invention.

DETAILED DESCRIPTION OF THE INVENTION

In order to address the need for method of routing a call such that differential delays and absolute delays are reduced, a communication system is provided that sorts packets or messages at a transceiver such that differential delays and absolute delays are reduced, further resulting in less needed memory at a packet selector and reduced jitter. The sorting is based on a packet identifier that is associated with each packet or message, comprising data specific to the packet. A message may include one or more packets, however the use of the term "packet" throughout the following description is meant to include the term "message," which message may include more than one packet. Successful practice of the invention does not require that a message be broken up into multiple subparts or packets.

Figure 1:
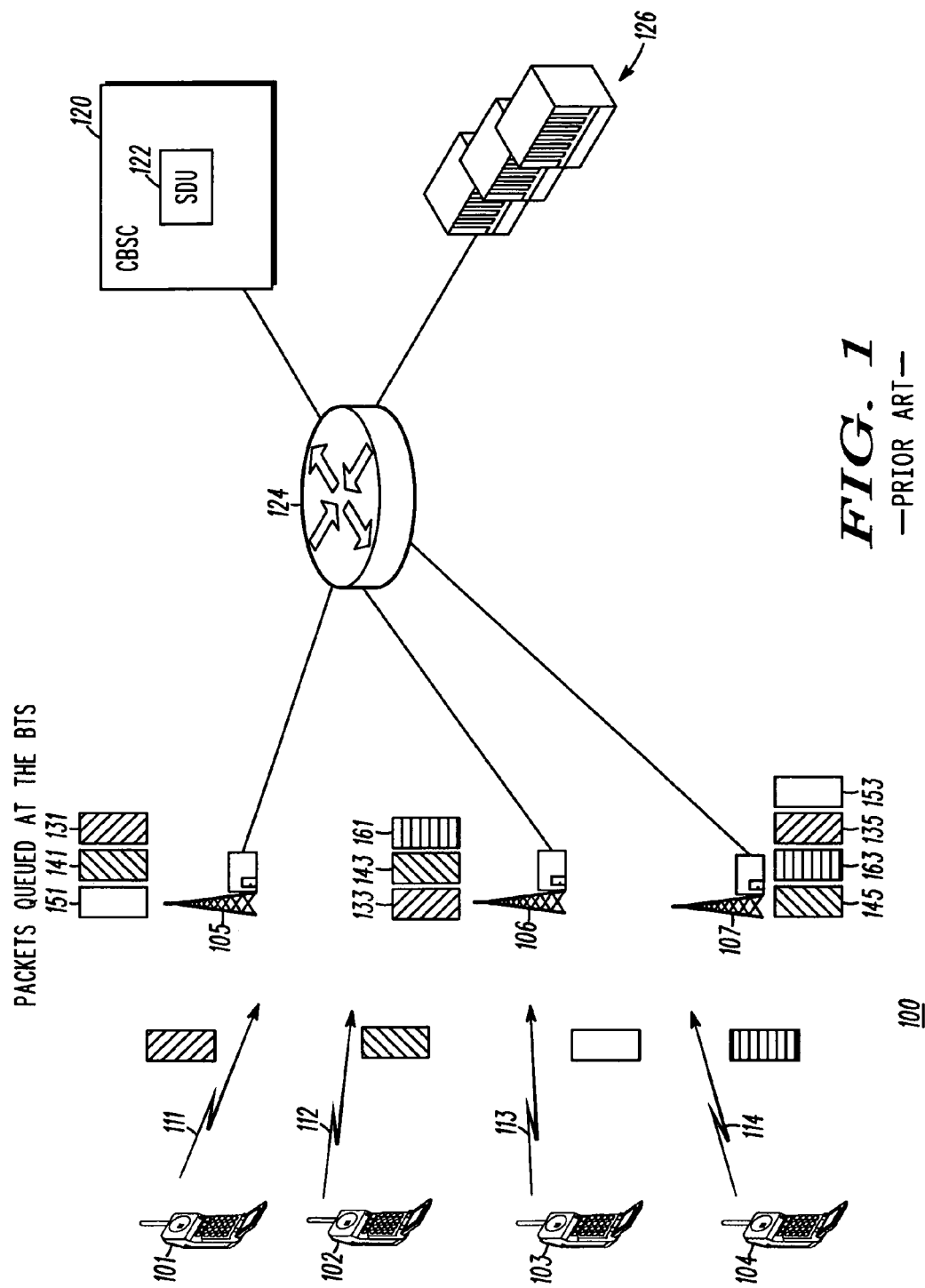
FIG. 1 is a block diagram of an exemplary non-sorting communication system.
Figure 2:
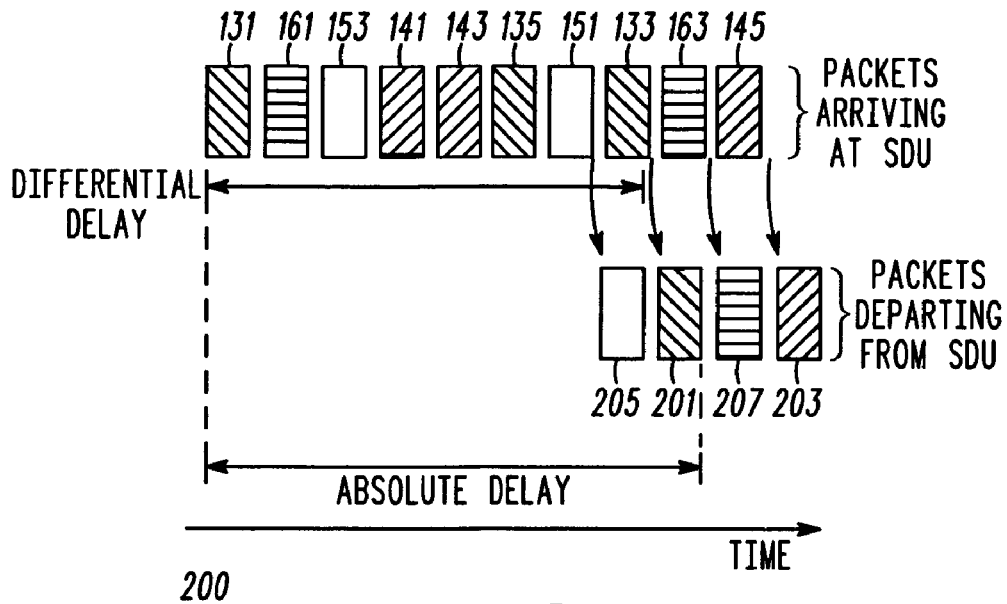
FIG. 2 is a timing diagram showing unsorted, queued packets in accordance with the communication system of FIG. 1.

Referring now to FIGS. 1 and 2, an exemplary packet data communication system 100 is illustrated that does not include message, or packet, sorting. Communication system 100 includes multiple radio frequency (RF) transceivers, preferably base stations, 105–107 (three shown) and multiple remote units or communication units 101–104 (four shown), such as StarTAC™ cellular telephones available from Motorola, Inc., or any other digital communication device capable of engaging in a packet data communication. Each base station 105–107 and each communication unit 101–104 is capable of engaging in a packet data communication session with a respective communication unit 101–104 and base station 105–107.

As shown in FIG. 1, each communication unit 101–104 transmits a respective message, or packet, 111–114 that is received by one or more of base stations 105–107 to produce one or more versions, or soft hand-off (SHO) legs, of the transmitted message or packet. Each version, or leg, of the transmitted packet is a replica of the transmitted packet subject to modulation introduced to the packet by the propagation environment. Each base station 105–107 stores the received packet legs in a queue in the order in which the packet legs are received and processed by the base station. For example, a queue for base station 105 includes, from top to bottom of the queue, a leg 131 of packet 111, a leg 141 of packet 112, and a leg 151 of packet 113. A queue for base station 106 includes, from top to bottom of the queue, a leg 161 of packet 114, a leg 143 of packet 112, and a leg 133 of packet 111. A queue for base station 107 includes, from top to bottom of the queue, a leg 153 of packet 113, a leg 135 of packet 111, a leg 163 of packet 114, and a leg 145 of packet 112. Variations in queue orders can result from varying propagation delays in the transmission of a packet to various base stations and variations in processing time for each packet leg at a base station. Each packet 111–114, and correspondingly each leg of the packet, includes a header that is assigned by the communication unit transmitting the packet and that includes a destination identifier, or address, for the packet. Preferably the destination identifier includes an Internet Protocol (IP) address and a universal datagram protocol (UDP) address. Those who are of ordinary skill in the art realize that data fields other than IP and UDP addresses may be included in the destination address of a packet without departing from the spirit and scope of the present invention.

Each base station 105–107 forwards the legs stored in the base station's queue to a centralized base station controller (CBSC) 120 via an access node or router 124. Preferably, each base station 105–107 forwards its queue of legs to router 124 every 20 milliseconds (ms), although alternatively the base station may send its queue of packet legs at any time that the queue is non-empty. Typically, the legs are forwarded by a non-sorting base station in a first-in first-out manner. CBSC 120 includes a packet selector, preferably a Selector Distributor Unit (SDU) 122 such as TACStar SDU available from Motorola, Inc. Preferably, SDU 122 includes an IP address uniquely associated with the SDU and further includes multiple UDP addresses. Each packet leg is routed to SDU 122 with reference to the destination address included in the header of the leg. SDU 122 compares each leg of a packet to the other legs of the packet and selects the best version, or leg, of the packet. SDU 122 then forwards the best version, or leg, via router 124 to a bank of transcoders 126, such as XCDR transcoders available from Motorola, Inc. The base stations 105–107, CBSC 120, SDU 122, router 124, and transcoders 126 are collectively referred to as an infrastructure of communication system 100.

FIG. 2 is a timing diagram 200 illustrating an arrival of packet legs at SDU 122 and a departure of best versions of packets from the SDU in accordance with the operation of communication system 100. Timing diagram 200 is merely meant to illustrate the operation of a non-sorting communication system and is not intended to limit the invention in any way. Timing diagram 200 assumes that the delays incurred by packet transmission from a base station to SDU 122, and by the SDU to transcoders 126, are zero. The top part of timing diagram 200 shows packet legs arriving at SDU 122 from each of base stations 105–107 on a first-in first-out order. For example, the first leg queued at each of base stations 105–107, that is, legs 131, 161, and 153, respectively, are received first at the SDU, then the second legs in each queue, that is, legs 141, 143, and 135, are received next at the SDU, and so on.

Once SDU 122 has received all of the legs, or versions, for a particular message or packet, the SDU selects the best leg from among the legs received and forwards the best leg to transcoders 126, as shown in the lower part of timing diagram 200. For example, packet legs 131, 135, and 133 are each SHO legs of, or versions of, packet 111. SDU 122 determines a best leg, or a best version, 201 of SHO legs 131, 133, and 135 and conveys best version 201 to transcoders 126. Similarly, packet legs 141, 143, and 145 are each SHO legs of packet 112, packet legs 153 and 151 are each SHO legs of packet 113, and packet legs 161 and 163 are each SHO legs of packet 114. SDU 122 determines a best version 203 of packet legs 141, 143, and 145, a best version 205 of packet legs 151 and 153, and a best version 207 of packet legs 161, 163, and conveys the determined best versions 203, 205, and 207 to transcoders 126.

FIG. 2 further illustrates a differential delay from a receipt by an SDU of a first packet leg of a packet, for example packet leg 131 of packet 111, to a receipt by the SDU of a last packet leg of the packet, for example packet leg 133 of packet 111. A differential delay between packet legs, when long enough, causes an SDU to require extra memory in order to store all the versions for each packet. When many packets have such long differential delays, the amount of extra memory that is required store multiple versions of each such packet until a best version of each packet is transmitted may become significant. In addition, due to the fact that the differential delay depends on a random queuing order at base stations 105–107, the differential delay is a source of delay jitter that can cause vocoder performance degradations (slipping, loosing parts of voice packets).

FIG. 2 also illustrates an absolute delay from a receiving of a packet, for example packet 111 (and associated packet legs 131, 133, and 135), by base stations 105–107 to a conveying of a best version of the packet, for example best version 201 of packet 111, to transcoders 126. The lengthier the absolute delay, the slower the performance of a communication system. Therefore, the present invention provides an apparatus and a method for reducing the differential delay and absolute delay of communication system 100. A reduction of differential and absolute delays results in a faster processing of data packets by a communication system infrastructure and reduces the amount of memory required by the operation of a communication system.

Figure 3:
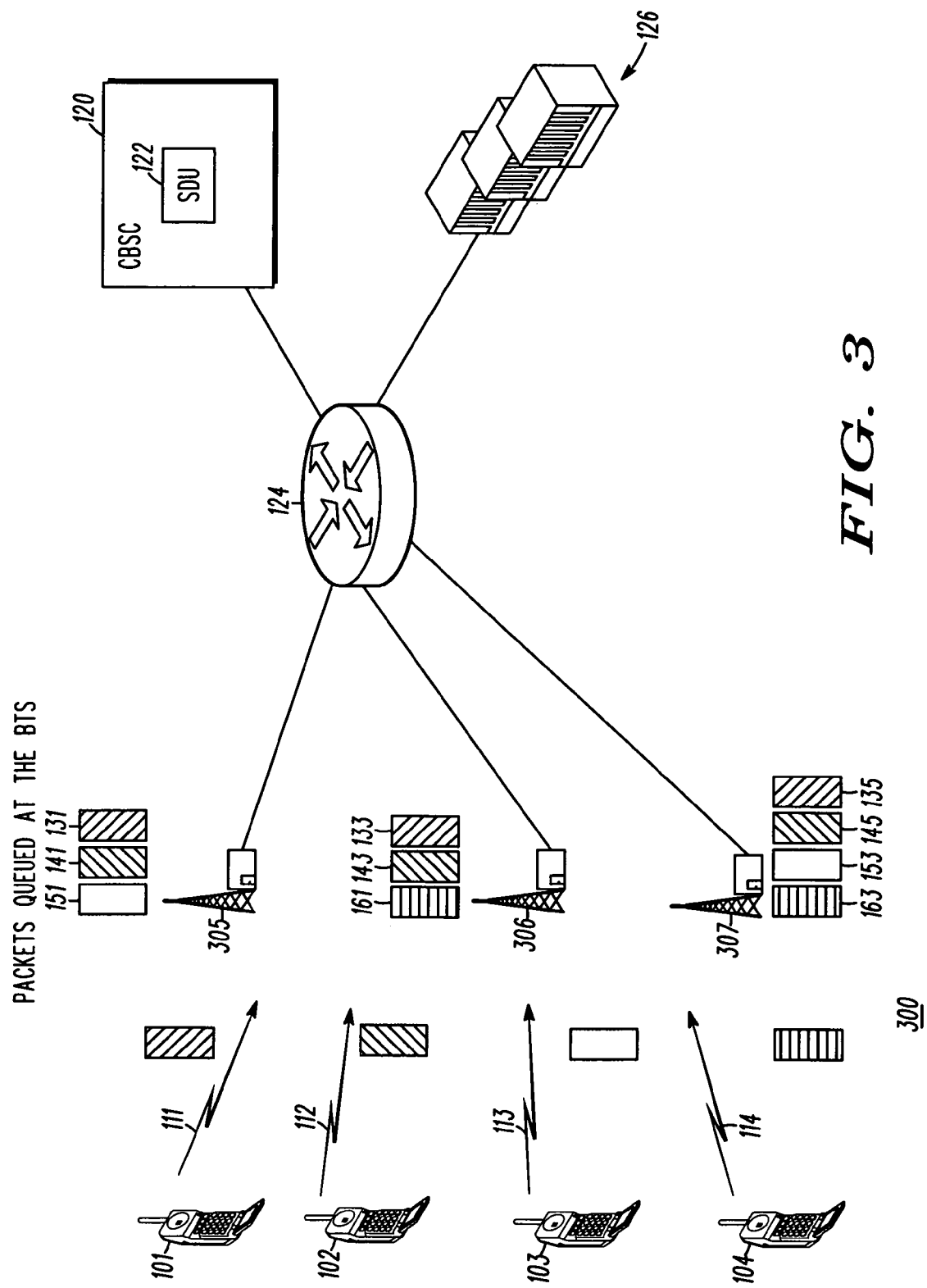
FIG. 3 is a block diagram of a communication system utilizing sorted, queued packets in accordance with an embodiment of the present invention.

FIG. 3 is a block diagram illustration of a communication system 300 in accordance with an embodiment of the present invention. Communication system 300 includes packet data sorting that is not performed by communication system 100. Preferably, communication system 300 is a CDMA communication system, although the present invention may be used in any communication system that transmits data packets, such as a Time Division Multiple Access (TDMA) communication system or an Orthogonal Frequency Division Multiple Access (OFDM) communication system. Similar to communication system 100, communication system 300 includes multiple communication units 101–104 that are each capable of engaging in packet data communication sessions with each of multiple RF transceivers, preferably base stations, 305–307. Communication system 300 further includes CBSC 120, transcoders 126, and router 124 that is in communication with each of base stations, 305–307, CBSC 120, and transcoders 126. CBSC 120 includes packet selector, preferably an SDU, 122. Base stations 305–307, CBSC 120, SDU 122, router 124, and transcoders 126 are collectively referred to as an infrastructure of communication system 300.

Communication system 300 assumes a reception of each packet 111–114 by one or more of base stations 105–107 in the same order as depicted in FIG. 1. Similar to communication system 100, each base station 305–307 in communication system 300 adds each received version, or leg, of a packet 111–114 to a queue and transmits a batch of queued packets to SDU 122 via router 124. However, in addition to performing the functions of base stations 105–107 of communication system 100, base station 305–307 also sorts the packet legs queued at the base station before forwarding the legs to router 124. By sorting the packet legs before forwarding them, communication system 300 is able to operate at reduce absolute and differential delays relative to communication system 100.

For example, base station 305 receives packets 111, 112 and 113, in that order, producing corresponding packet legs 131, 141, and 151. Base station 305 queues and sorts the packet legs, resulting in a queue in which packet leg 131 is on top, followed by packet legs 141 and 151. Base station 306 receives packets 114, 112 and 111, in that order, producing corresponding packet legs 161, 143, and 133. Base station 306 queues and sorts the packet legs, resulting in a queue in which packet leg 133 is on top followed by packet legs 143 and 161. Base station 307 receives packets 113, 111, 114, and 112, in that order, producing corresponding packet legs 153, 135, 163, and 145. Base station 307 queues and sorts the packet legs, resulting in a queue in which packet leg 135 is on top, followed by legs 145, 153, and 164.

Each base station 305–307 utilizes a sorting algorithm that is based on a packet identifier included in each version, or leg, of a packet. The sorting algorithm is used to sort the packet legs in each queue into a similar order. The packet identifier includes data in one or more data fields of a packet leg, which data the leg has in common with all other SHO legs of the same transmitted packet. The packet identifier may be in common with other transmitted packets as well, or may be data that differentiates the legs of a transmitted packet from the legs of other transmitted packets. In one embodiment of the present invention, each packet leg is assigned a packet identifier by the base station 305–307 that processes the leg. However, in another embodiment of the present invention, a packet identifier may be data in a data field that is assigned to the packet by a communication unit.

FIG. 4 is a block diagram of an exemplary packet identifier 400. Packet identifier 400 includes a number 401 of soft hand-off (SHO) legs of a packet as a most significant part and packet destination identifiers 403, 405 as respective middle and least significant parts. The number of SHO legs of each packet 111–114 is known by CBSC 120, which receives the legs from each base station 305–307 and can inform each base station, and each communication unit 101–104 via base stations 305–307, of the number of legs. The destination identifiers are based on the destination address of the packet from which the packet legs are derived and includes a port identifier 403, preferably a universal datagram protocol (UDP) address, and an IP address 405.

In another example of a packet identifier, the packet identifier may include only one or more of destination identifiers 403 and 405. Those who are of ordinary skill in the art realize that destination identifiers other than IP and UDP addresses may be used herein without departing from the spirit and scope of the present invention. In still another example of a packet identifier, the header of each packet 111–114, and of each version or SHO leg of the packet, may include a communication unit identifier that is assigned by, and uniquely associated with, a communication unit 101–104 transmitting the packet. The header may further include a packet sequence number associated with the packet as is known in the art. Each base station 305–307 then sorts each packet leg based on the communication unit identifier associated with the leg, the packet sequence number associated with the leg, or both the communication unit identifier and the packet sequence number. When sorting messages by packet identifier, the sort may be high to low or low to high, as long as each base station 305–307 sorts the same way and uses the same sorting algorithm.

Figure 5:
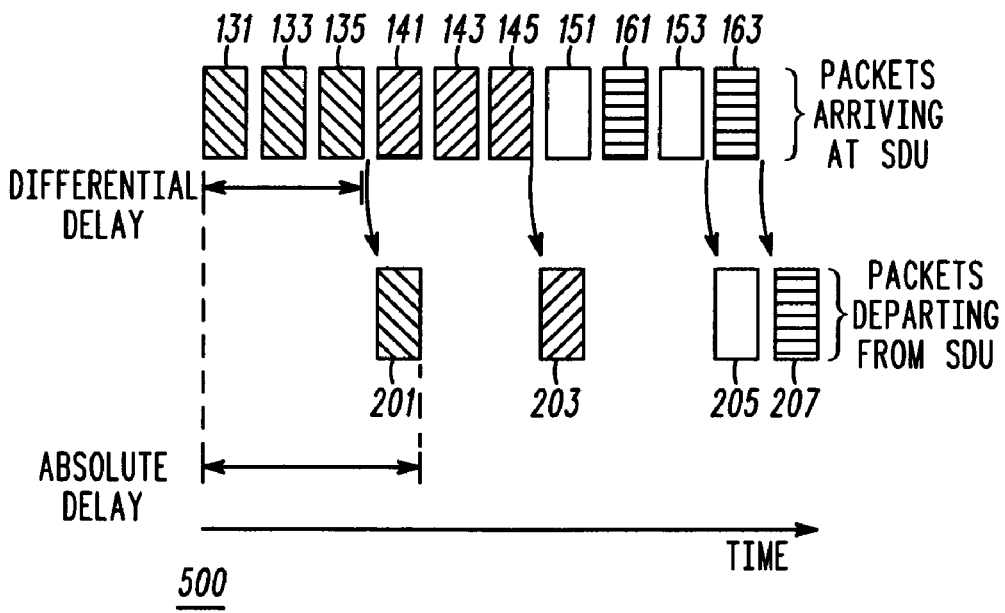
FIG. 5 is a timing diagram showing sorted, queued packets in accordance with an embodiment of the present invention.

FIG. 5 is a timing diagram 500 illustrating an arrival of packet legs at SDU 122 and a departure of best versions from the SDU in accordance the operation of communication system 300. Timing diagram 500 is shown for the purpose of assisting the reader in understanding the principles of the present invention and is not intended to limit the invention in any way. Similar to timing diagram 200, timing diagram 500 assumes that delays incurred by packet transmission from a base station 305–307 to SDU 122 and from the SDU to transcoders 126 are each zero.

The top part of timing diagram 500 shows packet legs arriving at SDU 122 from each of base stations 305–307 based on the order in which the packet legs are queued at each base station, which queues have been sorted pursuant to a sorting algorithm. Once the SDU has received all of the versions or legs for a particular message or packet, the SDU selects the best version from among the versions received and forwards the best version to transcoders 126, as shown in the lower part of timing diagram 200.

For example, with reference to FIGS. 3 and 5, a sorted queue for base station 305 includes leg 131 at the top of the queue, followed by legs 141 and 151, a sorted queue for base station 306 includes leg 133 at the top of the queue, followed by legs 143 and 161, and a sorted queue for base station 307 includes leg 135 at the top of the queue, followed by legs 145, 153, and 163. The first leg queued at each of base stations 305–307, that is, legs 131, 133, and 135, respectively, are received first at SDU 122. SDU 122 compares packet legs 131, 133, 135 to each other and determines a best version 201 and forwards best version 201 to transcoders 126. Similarly, SDU 122 compares packet legs 141, 143, and 145 to each other and determines a best version 203, compares packet legs 151 and 153 to each other and determines a best version 205, and compares packet legs 161 and 163 to each other and determines a best version 207, which best versions 203, 205, and 207 are forwarded to transcoders 126. As a result of sorting by base stations 305–307, SDU 122 can determine and forward best version 201, 203, 205, and 207 more quickly, that is, with less absolute delay, than is the case in non-sorting communication system 100. Furthermore, as depicted in FIG. 5, each leg of a packet transmitted by a particular communication unit 101–104 arrives in very close time to the other legs for that particular packet, resulting in reduced differential delay.

In another embodiment of the present invention, CBSC 120 includes multiple SDU's, wherein each communication unit 101–104 is assigned a different SDU for a processing of the communication unit's call. As a result, SHO legs 131, 133, and 135 are forwarded to one SDU of the multiple SDUs, legs 141, 143, and 145 are forwarded to another SDU of the multiple SDUs, and so forth. By sorting the packet legs at base stations 305–307, each SDU of the multiple SDU's receives the packet legs associated with a packet that is a part of an assigned call in a shorter time period time rather than spread out over a longer period of time as with random queuing or first-in first-out processing as depicted in FIGS. 1 and 2.

By implementing sorting in the operation of communication system 300, each of the multiple versions, or legs, of a packet arrives at SDU 122 closer in time to each other, i.e., more clustered in time or with a reduced differential delay. For example, SHO legs 131, 133, and 135, whose best version is packet version 201, now have a reduced differential delay and a reduced absolute delay as compared to their processing according to the first-in first-out processing depicted in FIGS. 1 and 2. Similar benefits are shown for the processing of the other packets sent from the SDU 122 to transcoders 126. By sorting each queue based on a packet identifier before sending the queue to SDU 122, each base station 305–307 is able to reduce the contention of messages, or legs, at the SDU. As a result, traffic entering and leaving SDU 122 is more evenly spaced, thereby reducing queuing delay at the SDU and transcoders 126, reducing short-term memory requirements at the SDU, and reducing delay-related jitter.

FIG. 6 is a logic flow diagram 600 of steps executed by an RF transceiver in sorting packets in accordance with an embodiment of the present invention. The logic flow begins (601) when the transceiver, preferably a base station, receives multiple packets to produce multiple received packets. Preferably, each packet of the multiple packets is transmitted by a different communication unit of multiple communication units and each of the multiple received packets is a version, or SHO leg, of a corresponding transmitted packet. Each received packet of the multiple received packets includes a packet identifier. The transceiver then sorts (602) the multiple received packets, or legs, according to their respective packet identifiers and forwards (603) the sorted received packets to an upstream component, preferably a packet selector, of an infrastructure of a communication system. The logic flow then ends (604).

Figure 7:
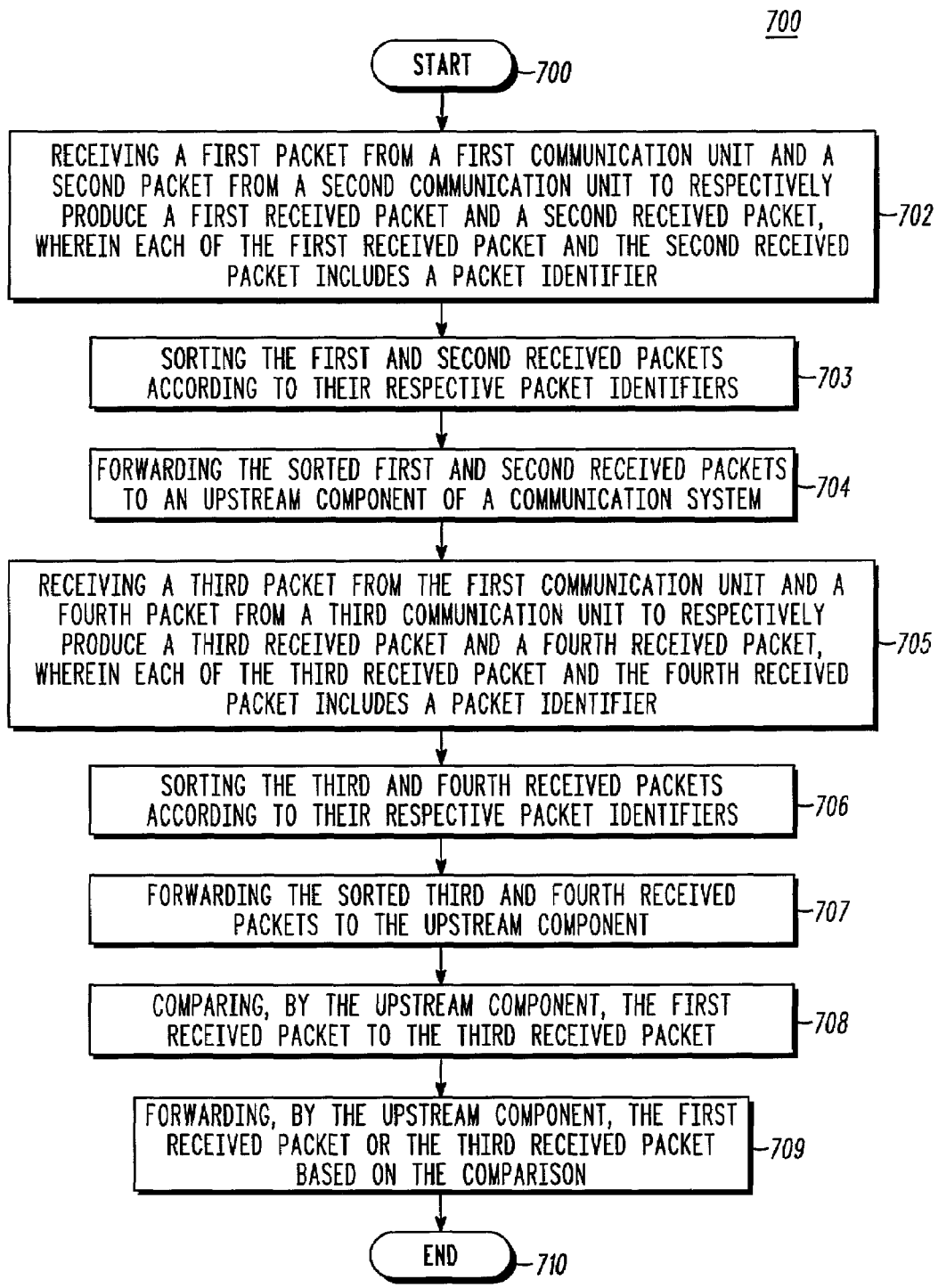
FIG. 7 is a logic flow diagram of steps executed by a communication system in sorting packets in accordance with another embodiment of the present invention.

FIG. 7 is a logic flow diagram 700 of steps executed by a communication system in sorting packets in accordance with another embodiment of the present invention. The communication system preferably includes a first transceiver, a second transceiver, and a component, preferably a packet selector, upstream of the first and second transceivers. The logic flow (701) begins when the communication system, preferably the first transceiver, receives (702) a first packet from a first communication unit and a second packet from a second communication unit to respectively produce a first received packet and a second received packet. Each of the first received packet and the second received packet includes a packet identifier. Preferably each of the first and second received packets is a first version, or SHO leg, of the corresponding transmitted packet. The communication system, preferably the first transceiver, sorts (703) the first and second received packets according to their respective packet identifiers and forwards (704) the sorted first and second received packets to the upstream component, preferably a packet selector, of the communication system.

The communication system, preferably the second transceiver, receives (705) a third packet from the first communication unit and a fourth packet from a third communication unit to respectively produce a third received packet and a fourth received packet. The third communication unit may or may not be the same as the second communication unit. Each of the third received packet and the fourth received packet includes a packet identifier. Preferably the third received packet is a second version, or SHO leg, of the first packet and the fourth received packet is a version, or SHO leg, of the fourth packet. The communication system, preferably the second transceiver, sorts (706) the third and fourth received packets according their respective packet identifiers and forwards (707) the sorted third and fourth received packets to the upstream component. The upstream component compares (708) the first received packet to the third received packet and, based on the comparison, forwards (709) the first received packet or the third received packet. The logic flow then ends (710).

The packet identifiers referenced with respect to each of FIGS. 6 and 7 includes data in one or more data fields of a received packet. Each received packet is preferably a soft-hand-off (SHO) leg of the corresponding packet transmitted by a communication unit, and each packet identifier is preferably data that the leg has in common with all other SHO legs of the same transmitted packet. The packet identifier may be in common with other transmitted packets as well, or may be data that differentiates the legs of a transmitted packet from the legs of other transmitted packets. For example, the packet identifier may include a number of soft-handoff legs of a transmitted packet, a destination identifier of the packet or packet leg, an identifier of a communication unit that transmitted a corresponding packet, or packet sequence number associated with the packet. In one embodiment of the present invention, each packet leg is assigned a packet identifier by the transceiver. However, in another embodiment of the present invention, a packet identifier may be data in a data field that is assigned to the packet by a communication unit that transmitted the corresponding packet.

In sum, by implementing packet sorting in the operation of a communication system, such as in base stations 105–107, each of multiple legs of a packet arrives at a downstream component, such as SDU 122, of the system closer in time to each other, i.e., more clustered in time or with a reduced differential delay. By sorting each of multiple queues based on a packet identifier before sending the queue downstream, a contention of the legs at the downstream component is reduced. As a result, traffic entering and leaving the downstream component is more evenly spaced, thereby reducing queuing delay at the downstream component, reducing short-term memory requirements at the downstream component, and reducing delay-related jitter.

While the present invention has been particularly shown and described with reference to particular embodiments thereof, it will be understood by those skilled in the art that various changes may be made and equivalents substituted for elements thereof without departing from the spirit and scope of the invention. In addition, many modifications may be made to adapt a particular situation or material to the teachings of the invention without departing from the essential scope thereof. Therefore, it is intended that the invention not be limited to the particular embodiments disclosed herein, but that the invention will include all embodiments falling within the scope of the appended claims.

What is claimed is:

1. A method comprising the steps of:
   receiving a first packet from a first communication unit and a second packet from a second communication unit to respectively produce a first received packet and a second received packet, wherein each of the first received packet and the second received packet comprises a packet identifier;
   sorting the first and second received packets according to their respective packet identifiers;

forwarding the sorted first and second received packets to an upstream component of a communication system;

receiving a third packet from the first communication unit and a fourth packet from a third communication unit to respectively produce a third received packet and a fourth received packet, wherein each of the third received packet and the fourth received packets comprises a packet identifier;

sorting the third and fourth received packets according to their respective packet identifiers;

forwarding the sorted third and fourth received packets to the upstream component;

comparing, by the upstream component, the first received packet to the third received packet; and forwarding, by the upstream component, the first received packet or the third received packet based on the comparison.

2. The method of claim 1, wherein the second communication unit and the third communication unit are the same communication unit.

3. The method of claim 1, wherein first received packet is a first soft-handoff (SHO) leg of the first packet and the third received packet is a second SHO leg of the first packet.

4. The method of claim 1, wherein the upstream component is a packet selector.

5. A communication system comprising:

a first transceiver that receives a first packet from a first communication unit to produce a first received packet that comprises a packet identifier, receives a second packet from a second communication unit to produce a second received packet that comprises a packet identifier, sorts the first and second received packets according to their respective packet identifiers, and forwards the sorted first and second received packets to a packet selector;

a second transceiver that receives a third packet from the first communication unit to produce a third received packet that comprises a packet identifier, receives a fourth packet from a third communication unit to produce a fourth received packet that comprises a packet identifier, sorts the third and fourth received packets according to their respective packet identifiers, and forwards the sorted third and fourth received packets to the packet selector; and a packet selector that receives the sorted first and second received packets from the first transceiver and the sorted third and fourth received packets from the second transceiver, compares the first received packet to the third received packet, and, based on the comparison, forwards the first received packet or the third received packet.

6. The communication system of claim 5, wherein the second communication unit and the third communication unit are the same communication unit.

7. The communication system of claim 5, wherein the first received packet is a first soft-handoff (SHO) leg of the first packet and the third received packet is a second SHO leg of the first packet.

* * * * *